United States Patent [19]

Westheimer et al.

[11] Patent Number: 4,573,119
[45] Date of Patent: Feb. 25, 1986

[54] COMPUTER SOFTWARE PROTECTION SYSTEM

[76] Inventors: Thomas O. Westheimer, 2 Highland Dr., Peterborough, N.H. 03458; Peter D. Hipson, 4 S. Shore Dr., Jaffrey, N.H. 03452

[21] Appl. No.: 512,218
[22] Filed: Jul. 11, 1983
[51] Int. Cl.[4] .............................................. G06F 12/14
[52] U.S. Cl. .................................. 364/200; 178/22.09
[58] Field of Search .............................. 364/200, 900; 178/22.08, 22.09

[56] References Cited

U.S. PATENT DOCUMENTS

| | | | |
|---|---|---|---|
| 4,120,030 | 10/1978 | Johnstone | 364/200 |
| 4,168,396 | 9/1979 | Best | 364/200 X |
| 4,172,213 | 10/1979 | Barnes | 178/22.09 |
| 4,177,510 | 12/1979 | Appell et al. | 364/200 |
| 4,246,638 | 1/1981 | Thomas | 364/200 |
| 4,278,837 | 7/1981 | Best | 364/200 X |
| 4,465,901 | 4/1984 | Best | 364/200 X |

OTHER PUBLICATIONS

"Computer Dictionary and Handbook"-Sippl et al.-Second Edition, 1972; Howard W. Sams & Co.; pp. 137 and 163.

Primary Examiner—Harvey E. Springborn
Attorney, Agent, or Firm—David B. Harrison

[57] ABSTRACT

In a digital computing system with a central processing unit (CPU) and random access memory (RAM), an improved data access limitation and protection subsystem protects data stored within predetermined boundaries of the RAM. An operation code detector detects a unique operation code stored in the RAM and fetched by the CPU, and puts out a signal when the unique operation code is detected. An address latch stores a high and a low digital boundary address put out by the CPU when the address latch is enabled by the signal from the operation code detector. An address comparator compares digital addresses subsequently put out by the CPU with the stored boundary addresses and puts out a signal as the result of the comparison. The address comparator signal controls a switch which enables or disables an address transformer and a bi-directional data transformer. A byte of data written by the CPU to the RAM is encoded by the data transformer, and a byte of data fetched by the CPU from the RAM is decoded by the data transformer; and the digital address location to which the byte of data is written and from which it is fetched is transformed from the digital address generated by the CPU in its normal mode of operation if the digital address of the byte of data within the RAM is not greater than the high boundary address and not less than the low boundary address.

11 Claims, 6 Drawing Figures

SYSTEM 20

COMPUTER SOFTWARE PROTECTION SYSTEM

The present invention relates to methods and apparatus for protecting software from unauthorized access, use, and/or misappropriation. More particularly, the present invention relates to methods and apparatus for safeguarding software within a microcomputer by the use of concurrent translation of data and addresses within a predetermined protection area of main memory in accordance with an algorithm which is made unique for each microcomputer equipped with the present protection system.

The need for safeguarding software from unauthorized access, modification and usage has become particularly acute with the proliferation and widespread use of monolithic microprocessor-based microcomputers. The effort required by skilled programmers to design, encode, and perfect a commercially useful program can frequently be measured in terms of man-months or years. Such software is then copied onto moveable storage media, most commonly floppy diskettes, which are then distributed to authorized users. If it develops that the particular software is worthwhile, the distribution thereof becomes widespread, as does the temptation to make unauthorized copies and uses.

There have been a number of proposals for "copy-protecting" floppy diskettes. Such efforts have met with limited success, and their mere existence has led to development of software intended to break through the copy protection scheme. One significant drawback of "copy-protection" schemes is that authorized users are precluded from making back up copies of software programs and data bases.

There have been several proposals for protecting software within a computer by adapting both the hardware and the software thereof to operate only in accordance with an algorithm which is made unique for each separate computer.

One such proposal is found in the U.S. Pat. No. 4,246,638, issued to William J. Thomas. The Thomas patent proposed a method for preliminarily encoding the operation code portion of an instruction as a function of the location of the instruction in main memory and as a function of the state of the computer at the time the instruction was to be executed. The drawbacks of the Thomas approach, in addition to the inherent complexity of the many uniquely connected circuit elements required to process a Thomas-encoded program, included the fact that it encoded only operation codes and, optionally, operands, but not addresses, and it dedicated three bit positions of the address bus to enable and disable the protection function. The Thomas approach thus provided only a moderate level of protection at the high price of severely restricting the size of main memory.

Another proposal is found in the U.S. Pat. No. 4,168,396 to Robert M. Best. The Best patent describes a software protection system which deciphered preliminarily encoded information by combining the information with its address. A significant drawback of the Best approach is that it contemplated a computing environment wherein only protected software would be used with the proposed hardware. Thus, Best proposed in one preferred embodiment that the lower half of main memory be protected, thereby making it impractical, if not impossible, for the computer hardware to be usefully applied in connection with software which was not preliminarily encoded in accordance with the Best approach.

The widespread and increasing use of computers makes ever more pressing the need for a practical, cost-effective computer software protection system which does not interfere with the non-protected use of a computer and which provides for an encoding scheme of sufficient complexity to effectively eliminate the problem of unauthorized software usage. The present invention addresses this need directly with a method and apparatus for temporarily protecting a limited and variable segment of computer memory. Software security is insured by transforming operation codes, data, and address locations within said segment, yet computer users have the complete and unencumbered use of their machines when the system is quiesced.

SUMMARY OF THE INVENTION WITH OBJECTS

One general object of the present invention is to provide a software protection system which overcomes the limitations and drawbacks of the prior art approaches.

Another principal object of the present invention is to prevent use of software protected in accordance with the principles of the present invention.

A further object of the present invention is to provide an improved protection system which is readily implemented with available hardware elements or fabricated as a monolithic VLSI package, or as a hybrid circuit.

One more important object of the present invention is to provide an improved protection system which is totally transparent to the user and which remains quiescent until invoked by a unique operation code word, thereby enabling the full range of computer resources to be made available for use with non-protected software.

Another object of the present invention is to provide an improved protection system which enables protected and non-protected software to run concurrently on the same computer.

Yet another object of the present invention is to provide a protection system which enables protected software to be distributed in a universal protected format and then be automatically tailored for the uniquely different protection algorithm by the user's computer in accordance with a unique tailoring program.

Still one more object of the present invention is to provide a software protection system which protects a predetermined small yet key portion of the program, leaving major subroutines available for tailoring by each user.

These objects are accomplished in a software protection system which includes a data transformation circuit and an address transformation circuit which are selectively enabled by a transformation enable circuit. The transformation enable circuit is initially activated by a memory boundary operation code which will normally be one of the first instructions in an encoded program. Once activated, the transformation enable circuit monitors the flow of data and addresses between the central processing unit of the computer and the computer main memory. Data and addresses which fall within a segment of memory defined by the memory boundary operation code undergo transformation, while data and addresses which fall outside said segment remain unaffected.

The circuitry of the present invention has the advantage of ease of emplacement in both new and existing computers, yet it provides a higher level of protection than provided by existing systems and is effectively transparent to the user.

The protected software remains encoded throughout execution in the computer, as well as when embodied in the storage media, such as a floppy diskette.

These and other objects, advantages, and features of the present invention will be further understood and appreciated from a consideration of the following detailed description of a preferred embodiment, presented with the accompanying drawings.

DETAILED DESCRIPTION OF A PREFERRED EMBODIMENT

Figure 1:
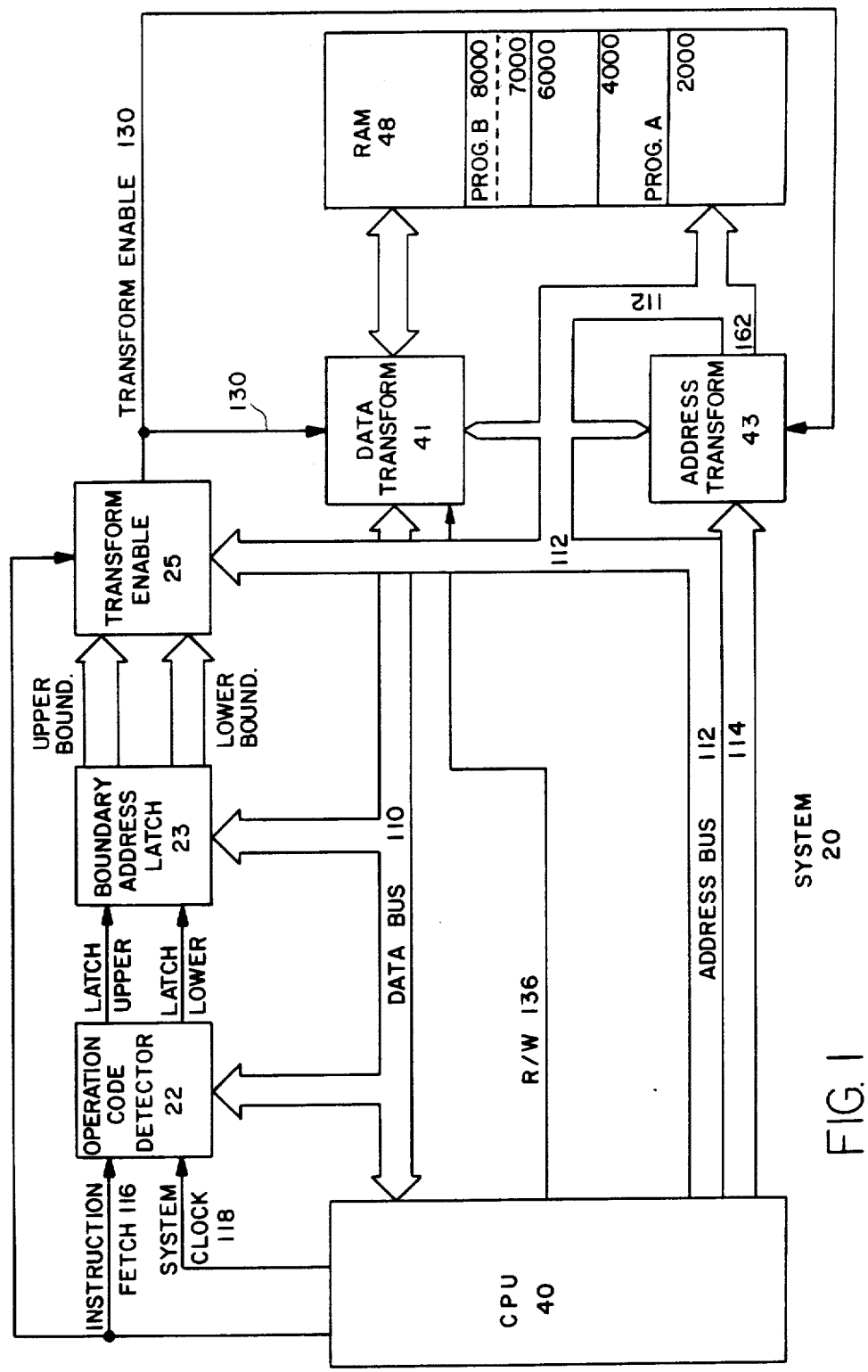
FIG. 1 is a simplified block drawing depicting the logical interrelationships among the various circuit elements of the present invention.

An improved programmable digital computer system 20 which incorporates the principles of the present invention is best understood by reference to the simplified block diagram of FIG. 1. The system 20 includes a prior art central processing unit (CPU) 40 and random access memory (RAM) 48, and the circuitry of the present invention. Although the CPU 40 may comprise a type 6502 monolithic integrated circuit microprocessor made by MOS Technology, Inc., 950 Rittenhouse Road, Norristown, Pa., 19401, and as described in its publication SY6500/MCS6500 *Microcomputer Family Hardware Manual*, copyright 1975, MOS Technology Inc., and by other second sources, and operates with a word length of eight binary digits (bits), it will be apparent that the principles of this invention may be applied to other CPU's with other word lengths with equal success.

As can be seen in FIG. 1, CPU 40 communicates with RAM 48 through data transform circuit 41 and address transform circuit 43. Both transform circuits are active only when enabled by transform enable circuit 25. When disabled, data passes through data transform circuit 41 and addresses pass through address transform circuit 43 in a completely unaffected manner, so that CPU 40 is able to operate normally with non-encoded software.

Data transform circuit 41 is bi-directional, i.e., when it is enabled, encoded data flowing from RAM 48 to CPU 40 is decoded, and non-encoded data flowing from CPU 40 to RAM 48 is encoded. Data flow direction through data transform circuit 41 is controlled by the read/write (R/W) signal generated by CPU 40 and put out over line 136.

The smallest addressable unit of storage in RAM 48 comprises eight bits, commonly referred to as a byte. Since address transform circuit 43 operates to transform only the lower eight bits of the total, e.g. sixteen bit address used by CPU 40, the address scrambling caused by the transformation process occurs within 256 byte intervals. The size of said interval is controlled by the number of address bits which are scrambled; thus if address transform circuit 43 were made to operate on the lower seven bits of the total address used by CPU 40, the address scrambling would occur within 128 byte intervals. Since the address space within which scrambling occurs may consist of many contiguous intervals, interval size does not present a maximum limitation to the range of addresses which may be protected. Rather, interval size is important in establishing the minimum address space which may be protected. The upper and lower addresses which define the contiguous address space within which transformation is to occur are set dynamically during program execution.

As already noted, transform circuits 41 and 43 are enabled by transform enable circuit 25. The conditions under which transform enable circuit 25 will put out a transform enable signal over line 130 are determined by operation code detector 21 and boundary address latch 23.

Operation code detector 22 is connected to data bus 110 and to instruction fetch line 116 and system clock line 118. Each time a signal is put out by CPU 40 over instruction fetch line 116, operation code detector 22 examines the value on data bus 110 to see if it matches a predetermined operation code. If a match is detected, operation code detector 22 stores the next two values put out over data bus 110 into the upper and then the lower boundary address latches in boundary address latch 23.

Note that the upper and lower boundary addresses stored in boundary address latch 23 each comprise eight bits. Transform enable circuit 25 continuously samples the eight high order address bits on address bus 112 to see whether a given address put out over bus 112 falls within the upper and lower limits set in boundary address latch 23. When this condition is met, and when it is also true that the address of the last operation code sent over data bus 110 fell within the upper and lower limits set in boundary address latch 23, a transform enable signal is put out over line 130. Transform enable circuit 25 "knows" when an address on bus 112 is an operation code address by also monitoring the instruction fetch signal put out by CPU 40 over line 116.

When a system reset occurs, as, for example, when the system 20 is powered on, the boundary addresses in boundary address latch 23 are both set to zero. This effectively quiesces any transform operations, since no possible address on address bus 112 will cause transform enable circuit 25 to put out a TRANSFORM ENABLE signal over line 130. A user of system 20 can therefore use the system to run non-encoded software and to develop personalized software without knowledge of the operation or even the presence of the data transformation circuitry.

RAM 48 in FIG. 1 depicts a non-encoded program A loaded at hexadecimal (hex) address location 2000 and extending to hex address location 4000, and a protected program B loaded at hex address 6000 and extending to hex address location 8000. The protected segment of program B, represented by the shaded area in the drawing, falls between the hex address locations 6000 and 7000 within RAM 48. One of the first instructions in the program B will comprise an operation code followed by two 8 bit words which will activate operation code detector 22 and boundary address latch 23, causing the hex value 70 (the first 8 bit word) to be stored in the upper boundary address latch and the hex value 60 (the second 8 bit word) to be stored in the lower boundary address latch. Any time data is thereafter caused to be fetched from or stored into RAM 48 at an address location which falls between hex 6000 and hex 7000 by an operation code which is itself resident within the protected segment, transform enable circuit 25 activates transform circuits 41 and 43. Neither the portion of program B which lies outside the protected area, nor any portion of program A which may be concurrently resident in RAM 48, is affected by the transform operations.

Should an attempt be made to load and run program B on a computer system which either does not include the required data transform circuitry to decode the protected segment of program B, or which includes data transform circuitry not matched to the encoding key unique to each individual copy of program B, the computer system will encounter nonsensical instructions and addresses in the protected segment, thereby preventing execution of program B.

The invention thus accomplishes its primary object of providing protection for encoded software while at the same time allowing for the full and unencumbered use of the system 20 with non-encoded software. The ability to set the upper and lower boundary addresses by means of a program instruction provides protection flexibility, since the size and location of the protected program segment can be varied dynamically according to individual program needs. When a protected program terminates, it can disable any further transformation by setting upper and lower boundary addresses to zero, or it can force the user to terminate the program by executing a system reset, which accomplishes the same result.

Figure 2:
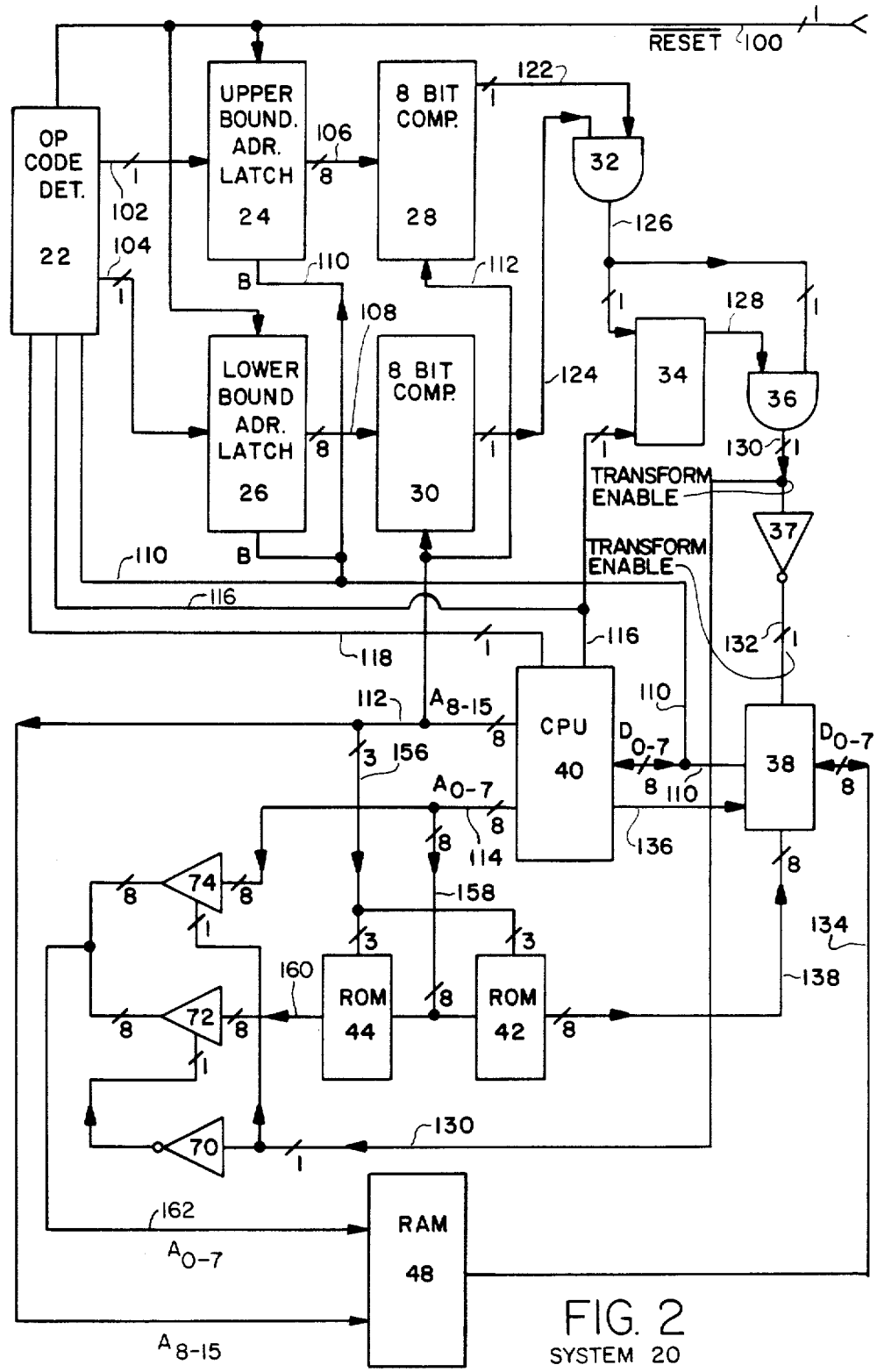
FIG. 2 is a more detailed block diagram of the major electrical components comprising the present invention.

For ease of presentation, the more detailed description of the circuitry of system 20 which follows is organized by functional groups. Reference is made to FIG. 2.

Operation Code Detector/Boundary Latch Circuit

The system 20 operates to transform data and addresses of data stored within program-defined address boundaries. The upper and lower boundary addresses are defined to and stored by the system 20 in the boundary latch circuit, comprising operation code detector 22, upper boundary latch 24, and lower boundary latch 26.

Figure 3A:
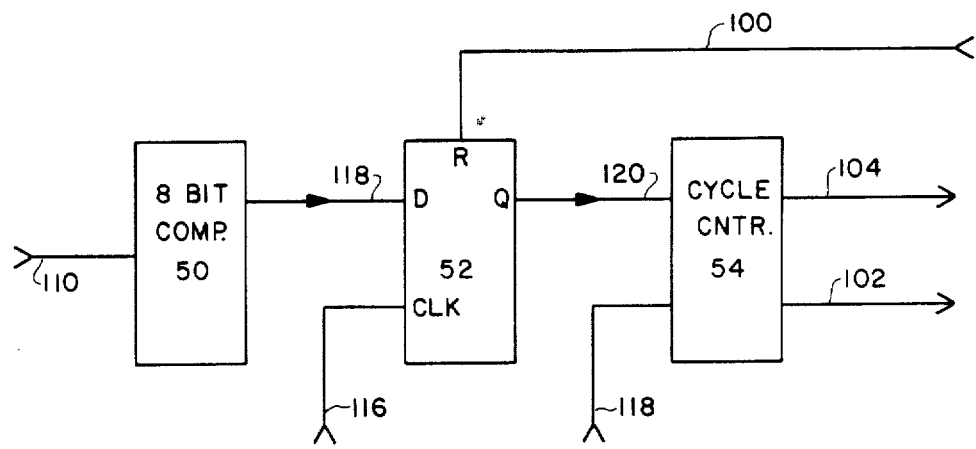
FIG. 3A is a detailed block diagram of the major electrical components which comprise the operation code detector circuit of the present invention.

The operation code detector 22 is explained with reference to FIG. 3A. Each time CPU 40 reads an operation code from RAM 48, the instruction fetch signal on line 116 goes high, causing D flip-flop 52 to set the signal on line 120 to the state of line 118. Line 118 is the output of 8-bit comparator 50, which compares the contents on data bus 110 with a predetermined stored value, and which sets the state of line 118 high when the value on the data bus 110 equals said predetermined stored value. Thus for line 120 to go high, two events must occur: CPU 40 must issue an instruction fetch command, and the resulting operation code placed on data bus 110 by RAM 48 must equal the predetermined value stored in 8-bit comparator 50. When line 120 is set high, cycle counter 54 is enabled.

The operation code which causes line 120 to go high also causes CPU 40 to fetch two 8-bit words from RAM 48. Coincident with each fetch, CPU 40 generates a clock pulse on line 118. The pulses on line 118, together with the enabling signal on line 120, cause the cycle counter 54 first to set line 104 high and line 102 low, and then to set line 102 high and line 104 low. When line 104 is set high, lower boundary latch 26 is enabled and the data byte present on data bus 110 is stored and put out on data bus 108. Bus 108 will retain this value until the event sequence is repeated causing a new value to be stored in lower boundary latch 26, or until lower boundary latch 26 is cleared by a RESET signal on line 100. Similarly, upper boundary latch 24 is enabled when line 102 is set high, and the data byte present on data bus 110 is put out and remains on data bus 106 until a new value is caused to be stored or upper boundary latch 26 is cleared by a RESET signal on line 100.

Transform Enable Circuit

The high-order eight bits of any address put out by CPU 40 over the 16-bit address bus comprising bus 112 and bus 114 are directed to the 8-bit comparators 28 and 30. Upper range comparator 28 has the additional input of bus 106 from upper boundary latch 24, and lower range comparator 30 has the additional input of bus 108 from lower boundary latch 26. Upper range comparator 28 sets output line 122 high if the latched address value on bus 106 is greater than the high-order address value on bus 112. Lower range comparator 30 sets output 124 high if the latched address value on bus 108 is less than the high-order address value on bus 112. Thus when the value on bus 112 is both less than the upper boundary address stored in upper boundary latch 24 and greater than the lower boundary address stored in lower boundary latch 26, lines 122 and 124 are set high. Lines 122 and 124 feed into AND gate 32; when 122 and 124 are high, line 126 is set high. Line 126 therefore is set high only when the high-order address on bus 112 falls between the upper and lower boundary addresses stored in boundary latches 24 and 26.

The output of AND gate 32 feeds into D flip-flop 34 and into AND gate 36. D flip-flop 34 is clocked by the instruction fetch signal generated by CPU 40 and put out over line 116. This arrangement causes the TRANSFORM ENABLE output of gate 36 on line 130 to be set high when an instruction fetch signal is generated by CPU 40 for an instruction stored within the the address range defined by the upper and lower boundary addresses stored in the upper and lower boundary latches 24 and 26. The latching characteristic of D flip-flop 34 will also cause any subsequent address put out by CPU 40 to set the TRANSFORM ENABLE output of gate 36 high, regardless of the state of the instruction fetch signal on line 116, providing that the address falls within the range defined by the upper and lower boundary addresses stored in the upper and lower boundary latches 24 and 26. This condition will remain true until an operation code is fetched by CPU 40 from an address in RAM 48 which falls outside the range defined by upper and lower boundary latches 24 and 26.

Figure 4A:
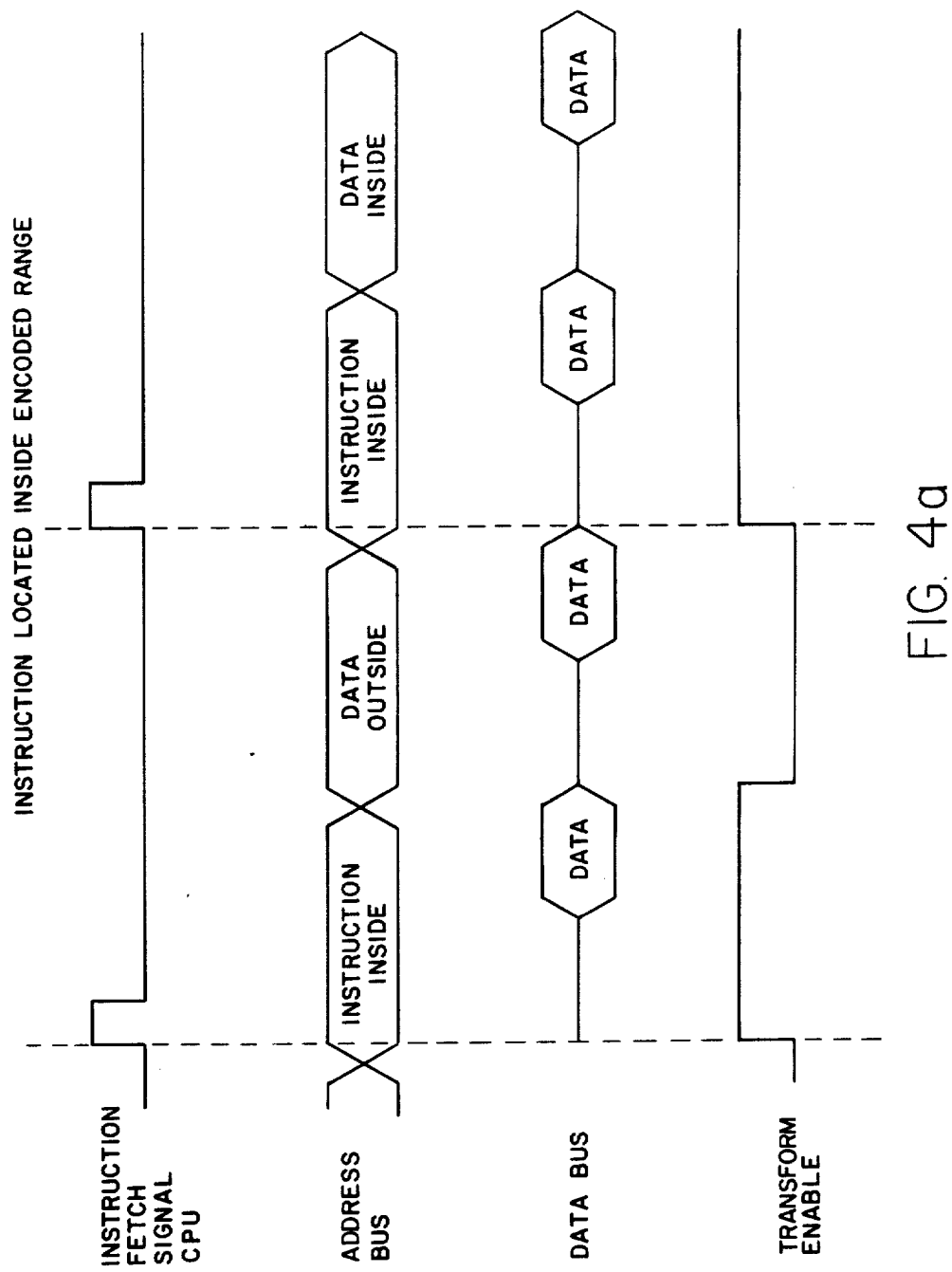
FIGS. 4A and 4B are timing diagrams which show the control sequences of the various circuits of the present invention.
Figure 4B:
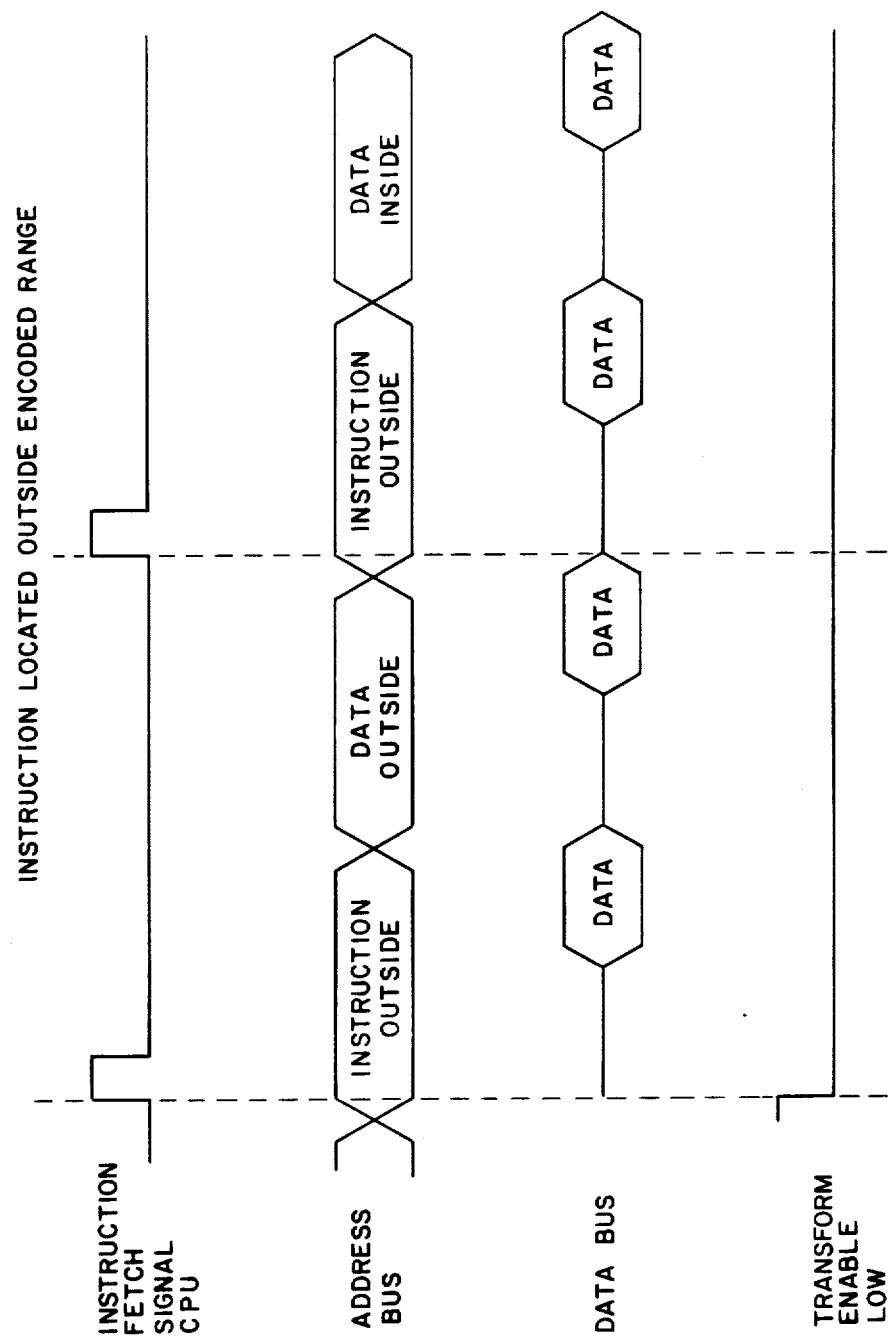

The TRANSFORM ENABLE signal generated by gate 36 controls both the data transformation circuitry and the address transformation circuitry, as will be explained later. It can be understood at this time, however, that the design of the encode enable circuitry has the following salient characteristics as depicted in FIGS. 4A and 4B:

the TRANSFORM ENABLE signal on line 130 can only be set high by an operation code which resides within the boundary address range defined by upper and lower boundary latches 24 and 26, i.e., by an operation code which is itself encoded.

once the TRANSFORM ENABLE signal on line 130 has been set high, any subsequent data put out or read in by CPU 40 residing at an address location which falls within the boundary address range defined by upper and lower boundary latches 24 and 26 will undergo transformation by the data transformation circuitry. Equally important, data put out or read in by CPU 40 which falls outside said boundary address range will not undergo transformation. An encoded operation code can therefore reference both encoded and non-encoded data.

once the TRANSFORM ENABLE signal on line 130 has been set high, any subsequent address put out by CPU 40 which falls within the boundary address range defined by upper and lower boundary latches 24 and 26 will undergo transformation by the address transformation circuitry. Equally important, addresses put out by CPU 40 which falls outside said boundary address range will not undergo transformation. An encoded operation code can therefore reference both encoded and non-encoded addresses.

once the TRANSFORM ENABLE signal on line 130 has been set low, no subsequent data put out or read in by CPU 40, regardless of its address, will undergo transformation by the data transformation circuitry. A non-encoded operation code can therefore reference encoded data, although this is not recommended.

once the TRANSFORM ENABLE signal on line 130 has been set low, no subsequent address put out by CPU 40, regardless of its value, will undergo transformation by the address transformation circuitry. A non-encoded operation code can therefore reference an address within the address range defined by the upper and lower boundary latches 24 and 26, although this is not recommended.

Bi-Directional Data Transformation Circuit

Figure 3B:
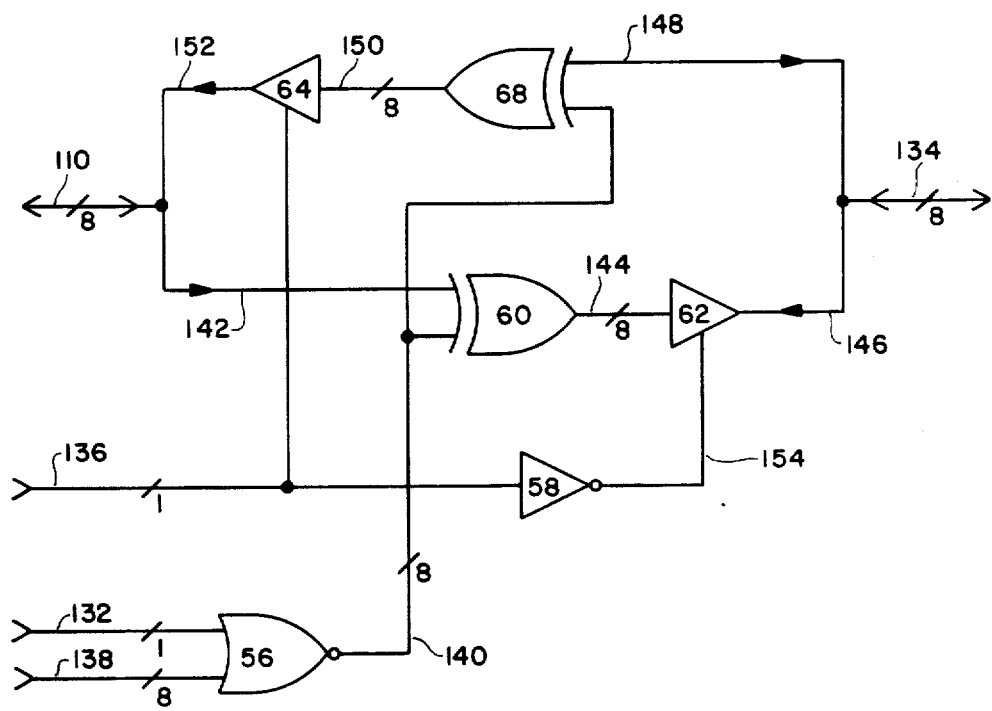
FIG. 3B is a detailed block diagram of the major electrical components which comprise the bi-directional data transformation circuit of the present invention.

The bi-directional data transformation circuit comprises ROM 42 and bi-directional gate 38. It can be seen in FIG. 2 that data flows between CPU 40 and RAM 48 only through bi-directional gate 38, regardless of the data flow direction. Bi-directional gate 38 is explained with reference to FIG. 3B.

Each of the individual gates depicted in bi-directional gate 38 actually represents eight identical gates, one for each bit of the 8-bit buses 110, 134, and 138. Bi-directional gate 38 is controlled by the signal on line 132, which is the inverted value of the signal on line 130. Line 132 is one input to each of the 8 NOR gates 56; the other input to each NOR gate 56 is one bit from the 8-bit bus 136 from ROM 42. When the TRANSFORM ENABLE signal of line 130 is low, i.e., data is not to be transformed, the signal on line 132 is high. This will force the output of each NOR gate 56 to be low, so that all 8 bits of bus 140 will be low. When the TRANSFORM ENABLE signal of line 130 is high, i.e., data is to be transformed, the signal on line 132 is low. This will cause the output bit of each NOR gate 56, which bits together comprise bus 140, to be the inverse of each corresponding input bit from bus 138.

Bus 140 feeds into the 2 sets of 8 exclusive-OR gates 60 and 68. When all 8 bits of bus 140 are low, i.e., when TRANSFORM ENABLE is low, the exclusive-OR gates 60 will cause the bus 144 to contain the same value as exists on bus 142. Similarly, bus 150 will contain the same value as exists on bus 148. Thus data which enters bi-directional gate 38 on bus 110 will flow in through gates 60 and out on bus 144 to bus 146 to bus 134 in a completely unaffected manner, and data which enters bi-directional gate 38 on bus 134 will flow in through gates 68 and out on bus 150 to bus 152 to bus 110, and will likewise remain unaffected.

The direction of data flow is determined by the read/write (R/W) signal generated by CPU 40 and put out over line 136. When the R/W signal is high, indicating a read operation, the signal will cause inhibit gates 64 to allow data to pass freely from bus 150 on bus 152, and thus to bus 110. The same R/W signal will pass through inverter 58 to inhibit gates 62, causing these gates to block the flow of data from bus 144 to bus 146. When the R/W signal is inverted by CPU 40 to indicate a write operation, gates 64 inhibit data flow from bus 150 to 152, and gates 62 allow data flow from bus 144 to 146.

When TRANSFORM ENABLE is high, line 132 will be low. As noted earlier, this will cause bus 140 to carry the inverted values of the corresponding bits comprising bus 138. These inverted values participate in exclusive-OR operations with the corresponding bits of buses 142 or 148 in gates 60 or 68, respectively, depending on the direction of data flow as determined by the R/W signal over line 132 from CPU 40. Thus TRANSFORM ENABLE will cause data flowing through bi-directional gate 38 from bus 110 to bus 134, or from bus 134 to bus 110, to undergo an exclusive-OR operation with the inverted value of bus 138.

The value of the data carried on bus 138 is determined in the following manner: ROM 42 contains eight addressable tables, each consisting of 256 addressable bytes of data. When data is to be read from or written to RAM 48 by CPU 40, the address of the data is put out by CPU 40 over address buses 112 and 114. Three bits of the high-order address bus 112 are selected and passed to ROM 42 on bus 156, and all eight bits of the low-order address bus 114 are passed to ROM 42 on bus 158. The three bits of bus 156 are used to select one of the eight tables stored in ROM 42, and the eight bits of bus 158 are used to select one of the 256 bytes from the selected table. The value thus selected is put out on bus 138 to the bi-directional gate 38.

Address Transformation Circuit

The address transformation circuit comprises ROM 44, inverter 70, and gates 72 and 74. ROM 44 is operated in a manner identical to the operation of ROM 42 described in connection with the data transformation circuit: three bits of the high order address bus 112 and all eight bits of the low order address bus 114 are passed to ROM 44 on buses 156 and 158 respectively. The three bits on bus 156 are used to select from among eight tables stored in ROM 44, and the eight bits on bus 158 are used to select from among the 256 bytes of data comprising each of the eight tables. The byte so selected is put out on bus 160 to a selector circuit comprising gates 72 and 74.

When an address is generated by CPU 40 for either a read or a write operation, the high order bits of the address pass directly to RAM 48 on address bus 112. The low order bits may also pass directly to RAM 48, or a substitution value may pass to RAM 48 instead, depending on the state of gates 72 and 74. The substitution value, if chosen, is the output value of ROM 44 as hereinbefore described.

Line 130, carrying the TRANSFORM ENABLE signal, is fed directly to inhibit gate 74 and is fed indirectly through inverter 70 to inhibit gate 72. When TRANSFORM ENABLE is high, inhibit gate 72 is disabled, allowing the output of ROM 44 to pass over bus 160 to bus 162. Simultaneously, inhibit gate 74 is enabled, blocking transmission of low order address bus 114 to bus 162. The address which reaches RAM 48 will therefore consist of a non-transformed high order byte and a transformed low order byte. When TRANSFORM ENABLE is low, inhibit gate 72 is enabled and inhibit gate 74 is disabled, thus causing the address passed to RAM 48 to consist of the non-transformed high and low order bytes of buses 112 and 114, respectively.

Having thus described an embodiment of the invention, it will now be appreciated that the objects of the invention have been fully achieved, and it will be understood by those skilled in the art that many changes in construction and circuitry and widely differing embodiments and applications of the invention will suggest themselves without departure from the spirit and scope of the invention. The disclosures and the description herein are purely illustrative and are not intended to be in any sense limiting.

We claim:

1. In a digital computing system including a central processing unit (CPU) capable of writing data to and reading data from a random access memory (RAM), which RAM is capable of storing and putting out data as a plurality of digitally addressable words under control of said CPU, and which CPU and RAM are connected by a common data bus for transfer of data words and a common address bus for transfer of address words, an improved data access limitation and protection subsystem for protecting data stored within software selectable boundaries of said RAM from unauthorized access by selective transformation and substitution of data and address words as enabled upon detection of a predetermined transformation control sequence in which a unique operation code word is followed by memory address upper and lower boundary words defining said boundaries, said subsystem comprising:

operation code detector means connected to said CPU and to said data bus for detecting said unique operation code word stored in said RAM and fetched by said CPU and for putting out an operation-code-present signal when said unique operation code word is detected;

address latch means connected to said operation code detector means and to said data bus for storing an upper boundary address word and a lower boundary address word put out by said CPU when said address latch means is enabled by said operation-code-present signal from said operation code detector means;

address comparator means connected to said CPU, to said address bus and to said address latch means for comparing digital addresses subsequently put out by said CPU with said stored boundary addresses and for putting out a transform enable signal upon determination that a said address put out by said CPU lies within a range defined by said boundary addresses as the result of said comparison;

address transformation means connected to said address bus between said RAM and said CPU and responsively connected to said address comparator means and enabled by said transform enable signal for transforming said digital addresses lying between said boundary addresses into different digital addresses in accordance with a predetermined address word transform;

bi-directional data transformation means connected to said data bus between said RAM and said CPU and responsively connected to said address comparator means and enabled by said transform enable signal for encoding data words as said words are written to said RAM by said CPU and for decoding bytes of data as said words are read from said RAM by said CPU in accordance with a predetermined data word transform;

whereby whenever said transform enable signal is put out by said address comparator means a word of data written by said CPU to said RAM is encoded by said data transformation means, and a word of data fetched by said CPU from said RAM is decoded by said data transformation means, and the digital address location to which said word of data is written and from which said word of data is fetched is different than the untransformed digital address generated and put out by said CPU.

2. The digital computing system set forth in claim 1 in which said bi-directional data transformation means comprises:

read only memory (ROM) means for storing said predetermined data word transform as a secret, predetermined set of data transformation words;

table lookup means connected to said address bus for using selected bits of the digital address of a data word to select a data transformation word of said transform stored within said ROM and for putting out said data transformation word;

bi-directional gate means connected to said table lookup means and to said data bus for combining said data word initially put out on said data bus with said data transformation word in an exclusive OR operation and for putting the result of said exclusive OR operation out on said data bus as a transformed data word during encoding operations and as a decoded word during decoding operations;

whereby said data word on said data bus is encoded and decoded as a function of its digital address.

3. The digital computing system set forth in claim 1 in which said address transformation means comprises:

read only memory (ROM) means for storing said predetermined address word transform as a secret, predetermined set of address transformation words;

table lookup means for using selected bits of the digital address word corresponding to a data word put out by said CPU in order to select a transformed address word stored within said ROM for putting out said transformed address word onto said address bus to address said RAM;

whereby said digital address is transformed into said transformed address as a function of its own value.

4. The digital computing system as set forth in claim 1 in which said address comparator means includes switch means for enabling and disabling said address transformation means and said bi-directional data transformation means in response to the transform enable signal.

5. A method for protecting software encoded in accordance with a predetermined encoding scheme from unauthorized use, alteration, misappropriation and the like, for use on a computer system having a central processing unit a main memory and a bi-directional data transform circuit and an address transform circuit which respectively transform address and data words in accordance with a predetermined transform arrangement, while at the same time in no way interfering with the ability of said computer system to use non-encoded software without impediment, comprising the steps of:

including in said software to be protected an operation code sequence in accordance with said predetermined encoding scheme, including in said sequence a transform operation code followed by an upper and a lower memory boundary address, which boundary addresses define a transform area of said main memory, operating said central processing unit with said protected software, detecting in said computer system the presence of said transform operation code and thereupon enabling a boundary address latch circuit and reading into said enabled boundary address latch circuit said upper and lower memory boundary addresses which follow said transform operation code and which define said transform area of main memory, comparing each address of each subsequent operation code word of said sequence with said latched upper and lower memory boundary addresses, and enabling said bi-directional data transform circuit and said address transform circuit upon determination that the address of the operation code being compared lies within said transform area, during CPU read operations from said main memory, decoding with said data transform circuit each data word and decoding with said address transform circuit each address word which follows said transform operation code in accordance with a predetermined inverse of said predetermined transform arrangement whenever each such data word and each such address word also lie within said transform area, and during CPU write operations to said main memory, encoding with said bi-directional data transform circuit each data word put out which follows said transform enabling operation code in accordance with said transform arrangement in the event that each such data word also is to be stored within said transform area.

6. The software protection method set forth in claim 5 further comprising the step of selectively disabling said transform circuits of said computer system by executing in said CPU a transform operation code followed by an upper and a lower memory boundary, which boundaries are equal values and indicate the lowest addressable location in main memory.

7. The software protection method set forth in claim 5 comprising the further steps of making said transform arrangement to be unique for each said computer system, encoding and distributing said software to multiple computer systems in accordance with a single predetermined encoding scheme, and tailoring said distributed software for each said computer system in accordance with the said transform arrangement unique thereto.

8. A method for operating a computing system including a central processing unit, a main memory and a selectively operable transform circuit intercepting data and address buses interconnecting said central processing unit and said main memory in at least two ways: a first way for use with an unencrypted software control program, and a second way for use with a software control program which has been encrypted in accordance with a predetermined encryption scheme to prevent unauthorized use, said encrypted software control program including a unique transform operation code word, followed with two memory address boundary words one of which identifies an upper boundary of a transform region of main memory and the other of which indentifies a lower boundary of the transform region, said second way of said method comprising the steps of:

detecting the occurrence of the transform operation code word during program execution, and thereupon recording the two memory address boundary words to fix the transform region of main memory, testing each subsequent operation code word to determine whether it addresses main memory within the transform region and thereupon operating the transformation circuit by decoding each address word addressing a location within the transform region in accordance with a predetermined address decoding scheme of the transform circuit which correlates to the encryption of the software and decoding each data word read at a location within the transform region in accordance with a predetermined data decoding scheme of the transform circuit which correlates to the encryption of the software during memory read operations of the system, and encoding each word to be written at a location within the transform region in accordance with a predetermined encoding scheme of the transform circuit which correlates to the encryption of the software during memory write operations of the system.

9. The software protection method set forth in claim 8 comprising the further step of selectively disabling said transform circuit by executing in the central processing unit a transform operation code word followed by upper and lower memory boundary address words, which address words are equal values and indicate the lowest addressable location in the main memory.

10. The software protection method set forth in claim 8 comprising the further step of selectively disabling said transform circuit by executing in the central processing unit an operation code which effectively clears the transform circuit of the transform operation code word and of the memory boundary address words.

11. The software protection method set forth in claim 8 comprising the further steps of:

encrypting multiple copies of the same control program in accordance with a single predetermined encryption scheme, making the transform process carried out by the transform circuit of a said computer system to be unique to that system, and converting a copy of the software to be compatible with the unique transform process of the particular computer system by executing a tailoring program which tailors the copy of the encrypted software control program to the characteristics of the particular computer system.

* * * * *